US006612840B1

(12) United States Patent
Turner (10) Patent No.: US 6,612,840 B1
(45) Date of Patent: Sep. 2, 2003

(54) HEAD-UP DISPLAY SIMULATOR SYSTEM

(75) Inventor: James A. Turner, Binghamton, NY (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 09/560,196

(22) Filed: Apr. 28, 2000

(51) Int. Cl.[7] .................................................. G09B 9/08
(52) U.S. Cl. .............................. 434/38; 434/29; 434/30
(58) Field of Search .............................. 434/29, 30, 38, 434/61, 62; 359/631, 632, 633

(56) References Cited

U.S. PATENT DOCUMENTS

| 4,218,111 A | * | 8/1980 | Withrington ............... 350/3.72 |
| 4,439,755 A | | 3/1984 | LaRussa |
| 4,621,898 A | * | 11/1986 | Cohen ..................... 350/276 R |
| 4,900,133 A | * | 2/1990 | Berman ....................... 350/346 |
| 5,138,555 A | * | 8/1992 | Albrecht ................ 364/424.06 |
| 5,400,174 A | * | 3/1995 | Pagis ......................... 359/359 |
| 5,566,025 A | * | 10/1996 | Knoll .......................... 359/630 |
| 5,684,634 A | * | 11/1997 | Rogers ....................... 359/630 |
| 5,907,416 A | * | 5/1999 | Hegg ........................... 359/14 |
| 6,014,117 A | * | 1/2000 | Hennessy ....................... 345/8 |

* cited by examiner

Primary Examiner—Derris H. Banks
Assistant Examiner—Kurt Fernstrom
(74) Attorney, Agent, or Firm—Andrew L. Tiajoloff; Tiajoloff & Kelly (57) ABSTRACT

A vehicle simulation system has an image system for projecting a simulated out-the-window scene and symbology as produced by a head-up display onto a viewing screen. A dummy beamsplitting or combiner structure is positioned so that the user can view the scene with the head-up display symbology through it. A filtering structure is provided on the combiner structure to prevent the user from viewing the head-up display symbology outside the combiner structure.

32 Claims, 6 Drawing Sheets

HEAD-UP DISPLAY SIMULATOR SYSTEM

FIELD OF THE INVENTION

The present invention relates to vehicle simulation systems, and more particularly to vehicle simulation systems with image systems that simulate a head-up display ("HUD").

BACKGROUND OF THE INVENTION

Vehicle simulation systems, such as flight simulator systems, are often used to train operators of such vehicles. Typically in such simulators the trainee views a simulated outside environment scene (called OTW, for "out the window") projected onto a screen by an image projector.

In real vehicles, especially aircraft, a head up display may be provided which projects information ("symbology") about targets, such as distance or speed, or a variety of other types of information, onto a combiner or beamsplitter positioned in front of the operator or pilot. The pilot looks through the combiner at the outside environment, and the head-up display optics keep the symbology information collimated and superposed from the operator's viewpoint over the associated targets or other objects outside the vehicle to which the symbology relates.

In the simplest HUD simulators, a dummy combiner is provided which is clear, and a HUD visual field containing the symbology is projected on the viewing screen together with the OTW scene. In such a system, the symbology remains superposed and collimated with the visible scene that it relates to because both the visual object and the symbology are projected at the same location on the screen. However, the combined HUD/OTW scene is fully visible from any angle and position in the simulated cockpit. This means that the pilot can see the symbology even when looking around the combiner, which would not be possible in a real vehicle.

SUMMARY OF THE INVENTION

It is therefore an object of the present invention to provide more realistic vehicle simulation systems with a simulated HUD display.

In one embodiment, a vehicle simulation system includes an image system with one or more projectors which project a scene comprising a simulated OTW scene and a simulated HUD symbology field, with the HUD symbology collimated and superposed with the objects in the simulated OTW scene. A dummy combiner structure is positioned so that the user can view the scene with the superposed symbology through it. A filtering structure is supported laterally outward of the combiner structure. This filtering structure permits the OTW scene to be seen through it, but does not permit the light of the symbology to pass therethrough. This prevents the user from viewing the symbology through the filtering structure, thereby reducing the possibility of viewing of the HUD symbology except through the dummy combiner.

In accordance with an aspect of the invention, the filtering structure has characteristics of a notch filter, and the HUD symbology light has a wavelength which is notched out by said filter.

In another embodiment of the present invention, the filtering structure has characteristics of a polarization filter, and the HUD symbology is projected with conflicting polarization so as to be blocked by said filter.

In accordance with still another aspect of the present invention, the HUD symbology is projected only intermittently, and the filtering structure has characteristics of a time-varied filter such that the filter is opaque when the HUD symbology is present.

The above, as well as further features of the invention and advantages thereof, will be apparent in the following detailed description of certain advantageous embodiments which is to be read in connection with the accompanying drawings forming a part hereof, and wherein corresponding parts and components are identified by the same reference numerals in the several views of the drawings.

DETAILED DESCRIPTION

Figure 1:
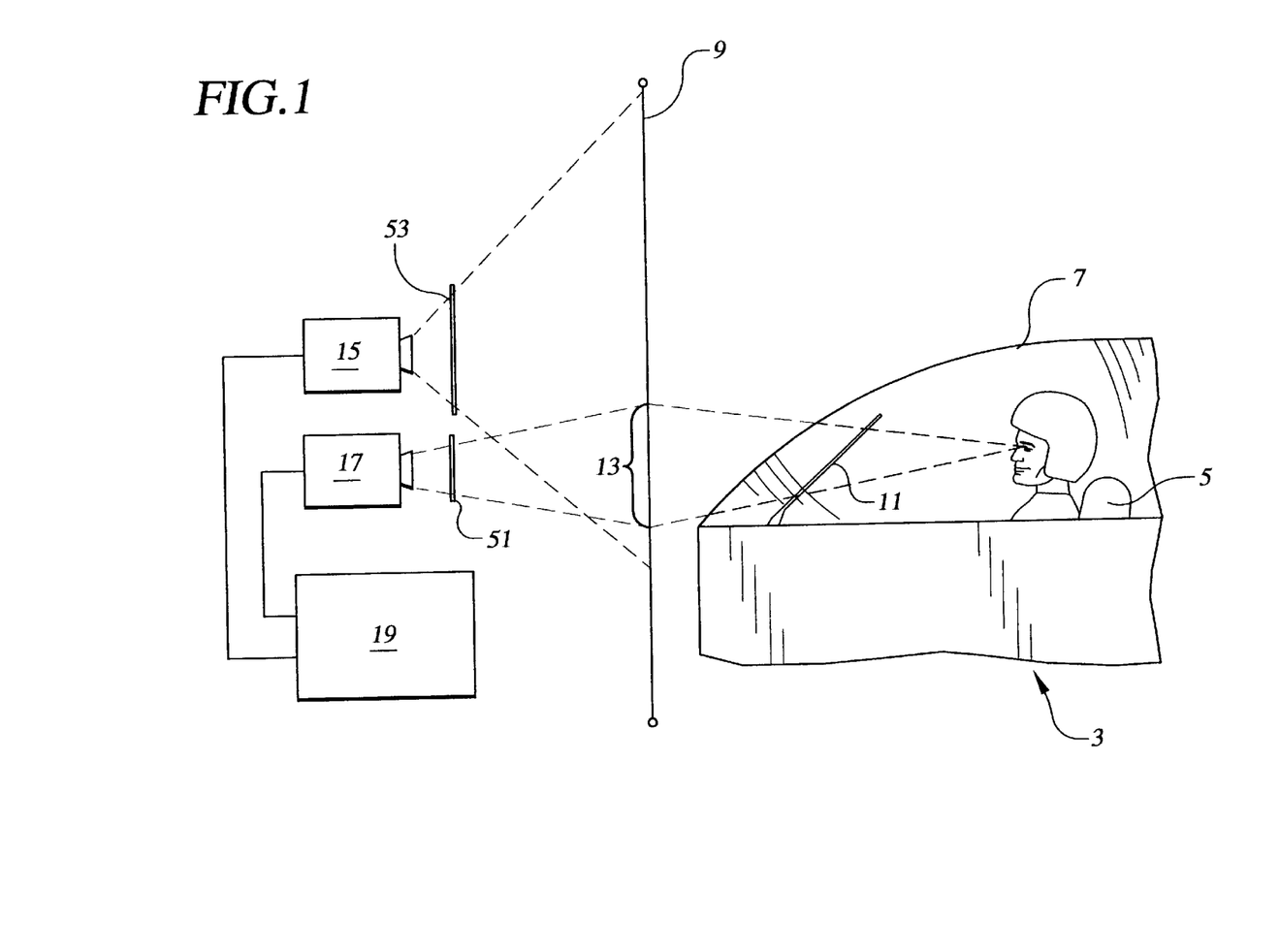
FIG. 1 is a schematic side view showing a cockpit portion of a simulator having a HUD symbology simulator according to the invention.

As best seen in FIG. 1, a simulator generally indicated at 3 comprises a seat 5 for a user. For additional realism a canopy 7 may be provided.

The user looks through the canopy 7 at an out the window ("OTW") scene projected on screen 9. The user also looks through a beamsplitter or combiner 11 through which it is possible to see a head-up display symbology field 13, which is also projected on screen 9.

The OTW scene is projected by OTW projector 15, and, preferably, the HUD field 13 is projected by a second projector, HUD projector 17, although a single projector could be used for both. Both projectors 15 and 17 are supplied with images by image generator 19, which is connected with the simulator 3 and derives various inputs therefrom, such as movements of the control stick or various controls of the simulated vehicle, as well as sensing the movements of the pilot or detecting the time-varying location of the pilot's head by a location sensor or system of location sensors (not shown).

Figure 2:
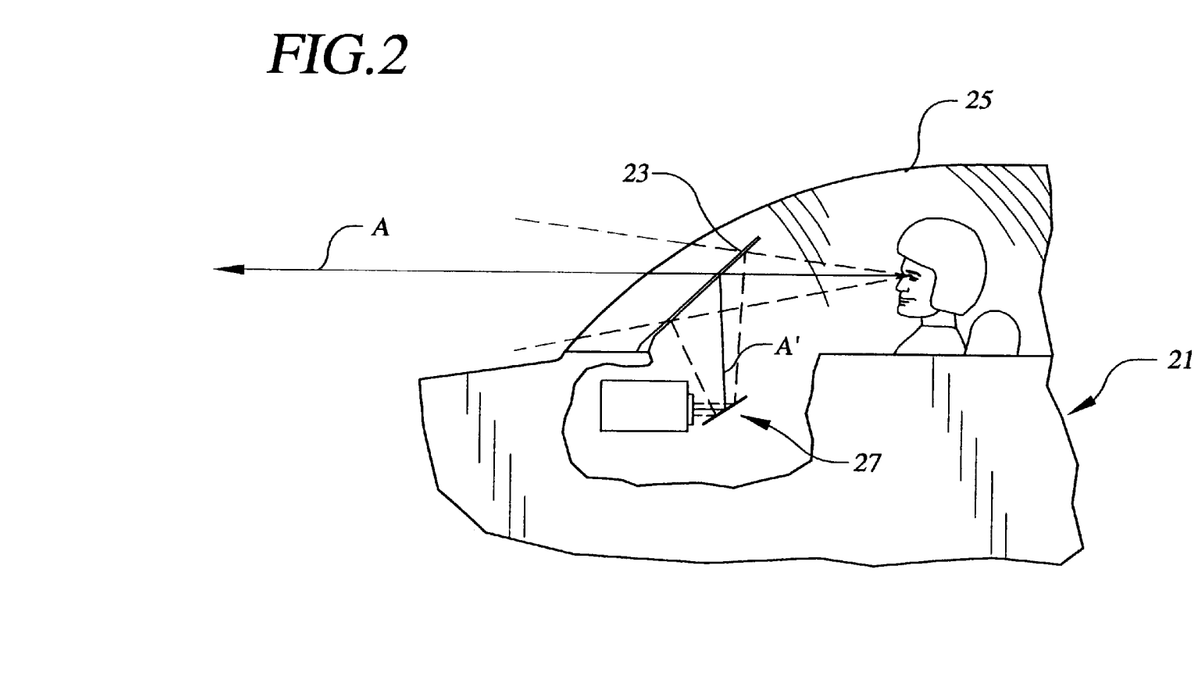
FIG. 2 is a schematic perspective view showing a real vehicle having a real HUD and combiner.

The simulator simulates a real vehicle having a real head-up display, such as the vehicle 21 illustrated in FIG. 2. Real vehicle 21 has a beamsplitter or combiner 23 which is transparent enough so the user can see therethrough into the surrounding environment. The real combiner 23 permits the operator to look out of the vehicle therethrough, and also reflects symbology created by a HUD system generally indicated at 27. Consequently, when the user is looking at a target along a line of sight such as line A, the target is viewed together with the symbology which is transmitted along reflected pathway A'. The optics of HUD system 27 are such that the symbology is focused at an infinite distance so that both the symbology and the target are in focus and superimposed properly to the user of the vehicle. In such a real vehicle system, the HUD symbology can be seen only when it is reflected in the combiner 23, within the frame of the combiner 23. If the pilot moves his head to look around the combiner 23 then the pilot looks directly through the canopy 25, and no HUD symbology is visible.

For purposes of the present simulator, the combiner 11 is preferably a dummy combiner, i.e., a transparent structure through which the pilot can see, and the HUD symbology is projected on the same screen as the OTW scene. If cost is not prohibitive, however, a real combiner such as used in the actual vehicle can be used.

In a simple HUD simulator system, the HUD symbology field is simply projected in the field 13 over the simulated OTW scene. Targets and symbology are projected together, providing correlated HUD symbology with imagery shown in the OTW scene. In this type of HUD simulation system, it is fairly easy for a user to move his head in the cockpit so that he can see the symbology of the HUD field 13 without looking through the combiner 11.

In the preferred embodiment, in order to provide a more realistic simulation of the HUD display, measures are taken to minimize the effect when the user moves his head and can see the HUD symbology field 13 without looking through the combiner 11, which would be impossible in a real aircraft or other vehicle. Such a simulator system is described in the copending U.S. patent application of James A. Turner and Ronald G. Hegg filed Mar. 7, 2000 assigned SER. No. 09/519957 and entitled VEHICLE SIMULATOR HAVING HEAD-UP DISPLAY. In such a system, the position of the pilot's head is detected, and, based on the position of the head (and, consequently, eyes) of the pilot, the projected simulation HUD field is cropped or trimmed to simulate the limits on viewing the HUD in a real system. Consequently, it is generally not possible to see the symbology when the pilot is looking around the outside of the combiner.

In this advanced type of HUD simulation system, referred to herein as a virtually occulting HUD simulation, the modeling of the visibility of the MUD symbology is based on a point of view at a single point of the pilot's head, preferably the midpoint between the pilot's eyes. A problem is encountered, however, because the lateral displacement of each eye from this midpoint (on the average about 1½ inches) means that each eye sees from a different point, and this allows the user to see around the combiner 11 to a degree.

Figure 4:
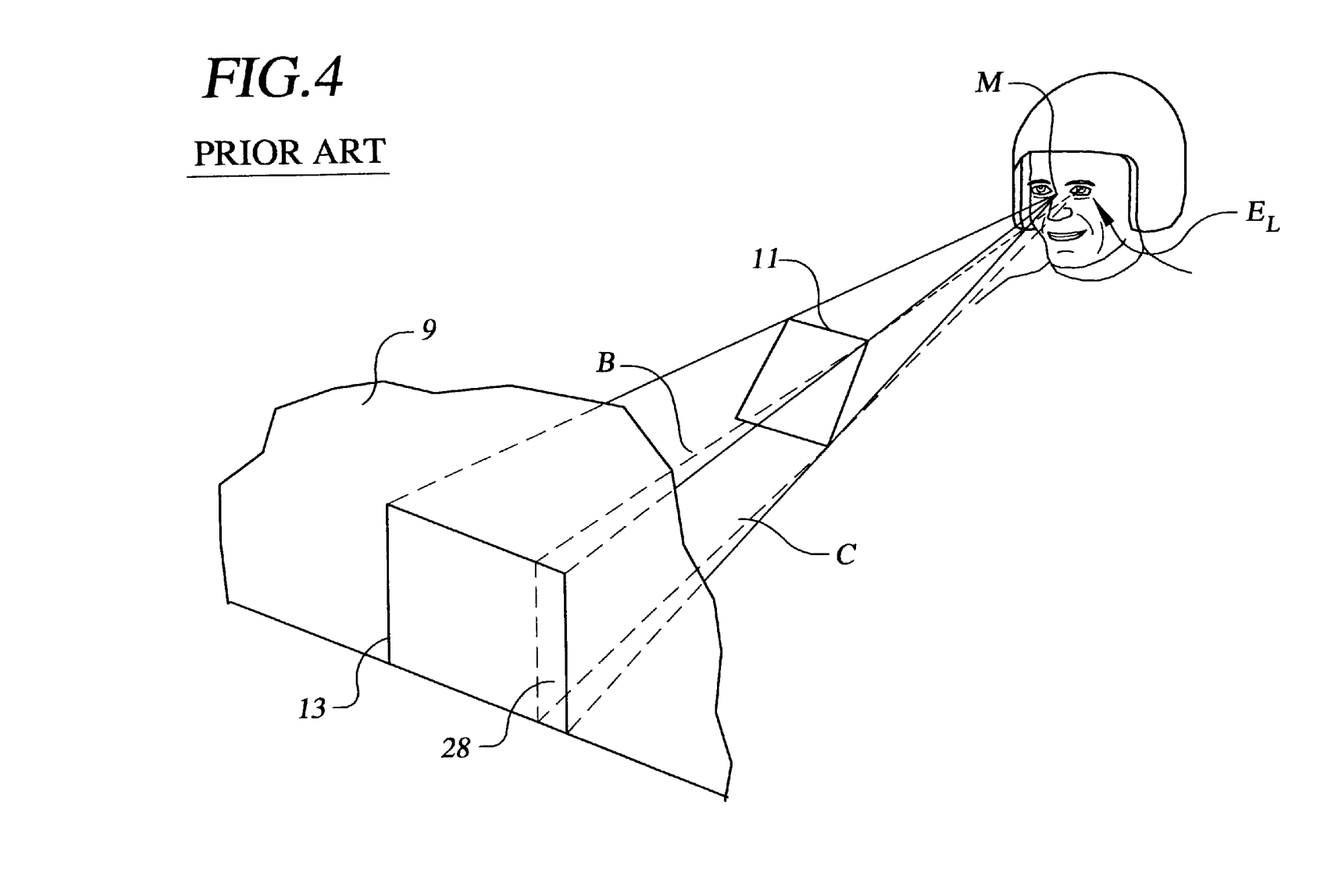
FIG. 4 is a perspective diagram illustrating the binocular problem of a user seeing the HUD symbology around the combiner in a simulator.

This binocular vision problem is illustrated in FIG. 4. The HUD field 13 is projected onto the screen in a position wherein the perimeter of the dummy combiner 11 aligns with the perimeter of the HUD field 13 along the lines of sight from a point of view indicated at M, the midpoint between the pilot's eyes. However, from the actual point of view $E_L$ of the left eye of the user, the lines of sight B and C allow the user's left eye to see around the left edge of the combiner 11. The result is that, to one side of the combiner 11, one eye of the pilot can see a vertical band 28 of the symbology of the HUD field 13 without looking through the combiner 11.

Figure 5:
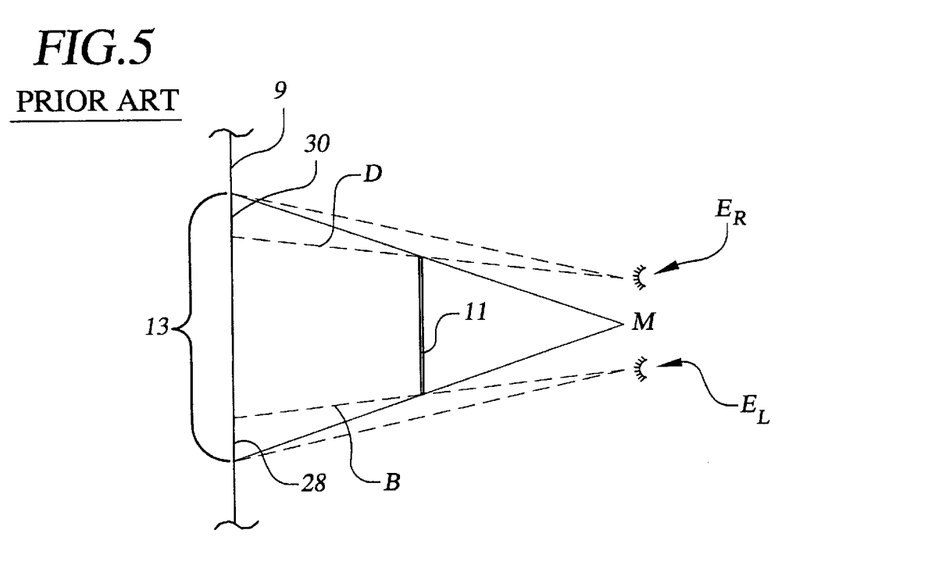
FIG. 5 is a plan-view perspective diagram illustrating the binocular problem of the user seeing the HUD symbology around the simulated combiner.

As best shown in the plan-view diagram of FIG. 5, a similar problem exists for the right eye $E_R$ of the user. As with the line of sight B for left eye view point $E_L$, line of sight D permits the right eye of the user to see a vertical band indicated at 30 laterally outward from the right side of the simulated combiner 11.

This binocular edge problem worsens when the head of the pilot is moved laterally a substantial distance from the center line of the simulator and the combiner 11, because the oblique angle permits the user to see an even greater amount of symbology to the side of the combiner.

Conceivably, the size of the edge bands 28 and 30 could be reduced by narrowing the HUD field so that it would not extend beyond the combiner for either eye. The result of this, however, would be to reduce the operating size of the HUD display, which would also not be realistic. The binocular problem could also conceivably be diminished in its effect by modeling the HUD field 13 to be viewed by one of the user's eyes, instead of midpoint M. However, the result would be usable only if the modeled eye is the user's dominant eye, and which eye is dominant varies over the population. Also, there are many pilots for whom neither eye is dominant, and modeling of the HUD field based on one eye would not resolve the binocular problem for them.

The present invention provides a system that may be used to eliminate or reduce the possibility of "looking around" the dummy combiner 11 of the simulator, and correcting the binocular vision problem of a band of HUD symbology visible to one eye of the user on each edge of combiner 11. The present invention may be used with a simple HUD simulation system where the HUD field is projected against the screen over the OTW scene without providing for alignment with the dummy combiner 11. The invention is particularly advantageous in more advanced systems virtually occulted HUD simulators where the projected HUD field is trimmed or modified to maintain alignment of the field 13 with the combiner 11 from a continuously detected user viewpoint, since that type of system presents the binocular problem discussed above.

Figure 3:
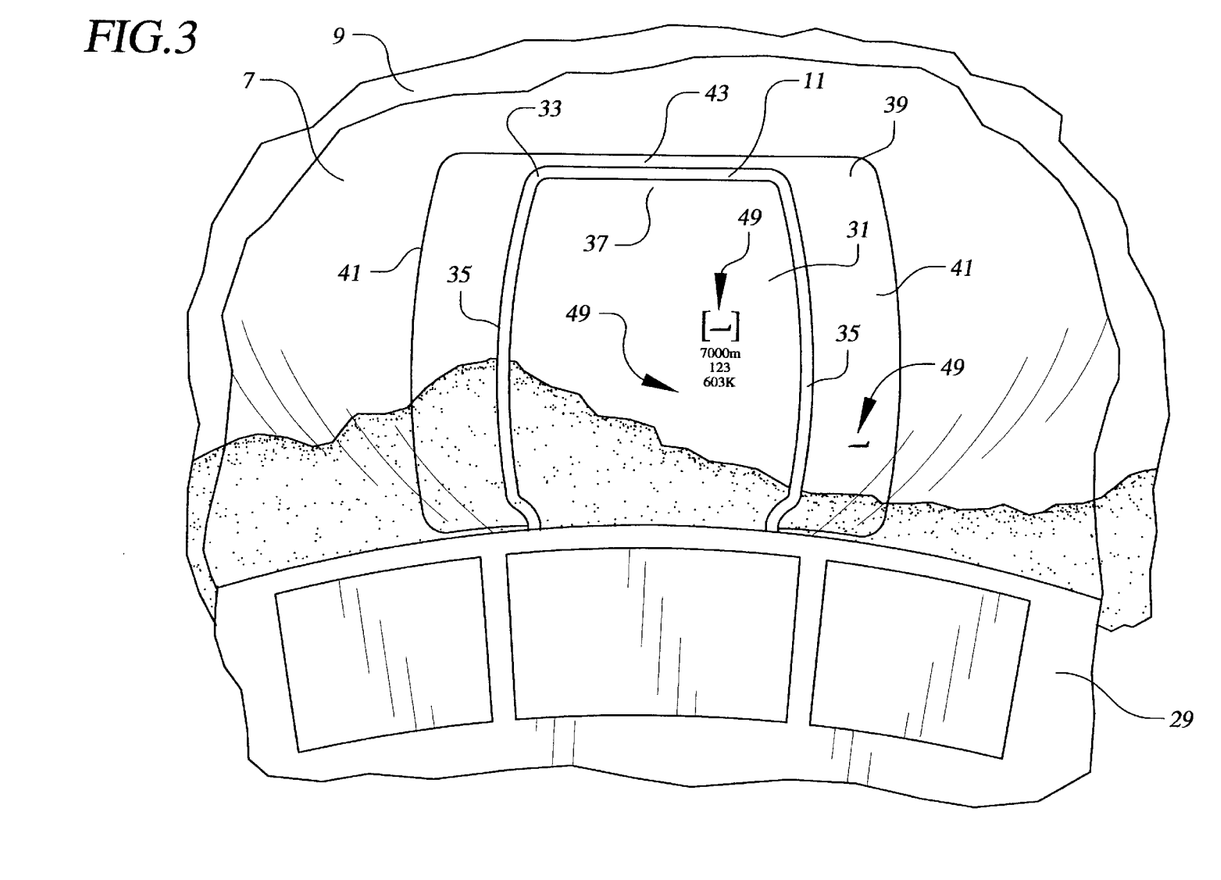
FIG. 3 is a front view from the user's position of a combiner for a simulator according to the present invention.

Referring to. FIG. 3, the pilot's view of the dummy combiner of the simulator of the present invention is shown. The combiner 11 is supported on the simulator cockpit 29. The simulator combiner 11 comprises a transparent central portion 31 supported in frame 33 supported on simulator cockpit 29. Frame 33 has left and right lateral sides 35 and upper edge 37.

A filter structure 39 is provided around the combiner 11, including lateral portions 41 projecting outward laterally from lateral sides 35 of the combiner and also an upper portion 43 projecting upwardly from the upward edge 37 of combiner 11. The lateral portions 41 extend at least 1 inch, and preferably at least about 1¼ inches laterally of the respective side of the frame. This distance corresponds to one half of the average Inter Pupillary Distance (IPD), i.e., the average lateral displacement of each eye of a human user from the midpoint therebetween, and is appropriate for use with the advanced HUD simulation which is modeled for visibility based on the user's changing point of view, to eliminate the binocular problem. The upper portion 43 extends above the combiner 11 to cover the eventuality that the user may tilt his head left or right while looking through the combiner 11 and see the HUD symbology over the top of the combiner with one eye while the other eye is lower and continues to see through the combiner. The distance that the upper portion 43 extends above the combiner 11 is dependent on the IPD and the degree to which a user can tilt his head left or right so as to elevate one eye higher than the other. Preferably the distance is at least about ¼ inch, and may be as much as about 1¼ inches (one-half the IPD).

In a simpler HUD simulator without such modeling, a larger filter 39 is preferable, because there are more positions from which the HUD field 13 can be seen in the cockpit. The filter structure 39 for such a simulator should be large enough to prevent the pilot from seeing the HUD symbology around the filtering structure 39 irrespective of the position of the pilot's head. The dimensions of a filtering structure 39 in this case will vary with configuration of the simulated cockpit, but it is expected that the filter structure in such an application will extend at least about 7 inches laterally outward from the lateral edges of the combiner 11, and at least about 3 inches upward from the upper edge 37 of the combiner 11.

According to the preferred embodiment, the HUD symbology field 13 which is projected corresponds to the field which can be viewed by the pilot through the transparent portion 31 of the combiner 11. A simulated target generally indicated at 45 is projected with information regarding this target displayed as symbology and generally indicated at 47. The simulated target 45, which is part of the OTW scene, and the associated simulated HUD symbology 47 can both been seen through the transparent middle portion 31 of the combiner 11.

The filtering structure 39 permits light from OTW scene to pass therethrough so that the user can see the OTW scene through the filter, but the filtering structure substantially blocks passage of the light of the HUD symbology therethrough. As a result, if a target, such as target 49, is viewed through the filtering structure 39, only the OTW scene aspect of the target passes through the filtering structure. Even if HUD symbology associated with target 49 is projected on screen 9 (as when a simple HUD projector is used without an image generator that models visibility of the HUD symbology through the combiner based on the user's head position), or if the symbology is in the line of sight of one eye of the user (the binocular problem discussed above), the HUD symbology is not visible, because it is filtered substantially completely out of the light passing through the filtering structure 39. However, the filtering need not be 100%, especially where a virtual occulting HUD simulator is used. In such a system, filtering of at least about 70%, and preferably about 80% to 90% of the light from the HUD display is sufficient. Where virtual occulting is not provided, a higher degree of filtering , e.g., at least about 90% and preferably at least 95 to 97%, is needed, because the pilot in such systems can move his head to a position where he can see the HUD symbology through the filter with both eyes simultaneously.

This filtering out of the HUD symbology can be accomplished in a number of ways.

Figure 7:
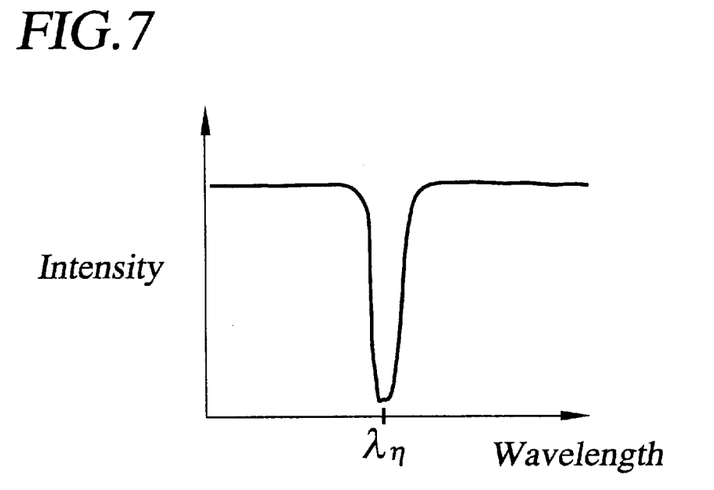
FIGS. 7 and 8 are graphs of the light transmissivity of filters used in the preferred embodiment.
Figure 8:
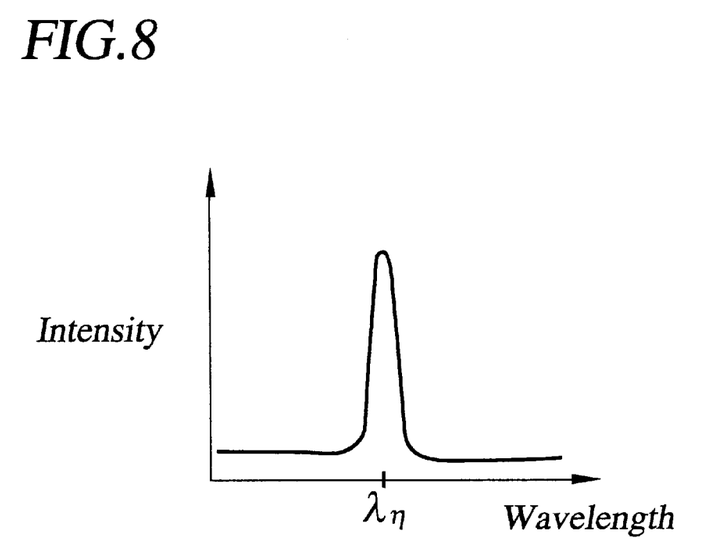

In the preferred embodiment, the filter is preferably narrow spectral blocking filter, typically a basic notch filter. Such a notch filter passes light of a plurality of wavelengths, or all visible wavelengths, except for a wavelength in a specific "notch". FIG. 7 shows a graph of the transmissivity of such a filter relative to wavelength, exhibiting low transmissivity at a notch wavelength $\lambda_n$. In order to project the HUD symbology at a wavelength that is filtered out by filtering structure 39, as best seen in FIG. 1, the HUD symbology projector 17 is equipped with a filter 51 which has transmissivity the opposite of that of the filtering structure 39. The transmissivity of this Filter 51 is shown in FIG. 8, which shows that the filter 51 passes only wavelengths of light around notch wavelength $\lambda_n$. The notch wavelength $\lambda_n$ preferably represents a shade of the color green, which is a common color for HUD displays, or the color of phosphorous usually used in the CRT in a real HUD.

It is preferred that the filtering structure 39 appear completely transparent even though it filters out a portion of the visible spectrum around the notch wavelength. Any variation in color between the OTW scene seen through the filtering structure 39 and as seen around it can be eliminated by projecting the OTW scene through a filter 53 having the same transmissivity as the filtering structure 39, i.e. the graph of FIG. 7.

Alternatively, the filtering structure 39 may be a polarizing filter, and the filter 51 for the HUD projected image complementarily polarizes the HUD display light, i.e., rotated 90°, relative to the filter placed around the combiner. This embodiment, however, requires that the projection screen preserve polarization of light of the HUD projected symbology. The OTW light waves, however, are either unpolarized, or filtered by a polarizing filter 53 which aligns polarity with the filtering structure 39. Consequently, the OTW scene light passes without loss of intensity through the polarizer of filter structure 39.

Another alternate embodiment of blocking filter around the combiner is a temporally switched filter. This filter operates intermittently, preferably periodically or cyclically, and turns alternately opaque and transparent at a rate which is too fast to see when the HUD projector is operating. The HUD symbology is projected in rapid periodic fashion, and is projected only during those moments when the filter is opaque. As a result, the HUD symbology cannot be seen by the user through the filtering structure.

Figure 6:
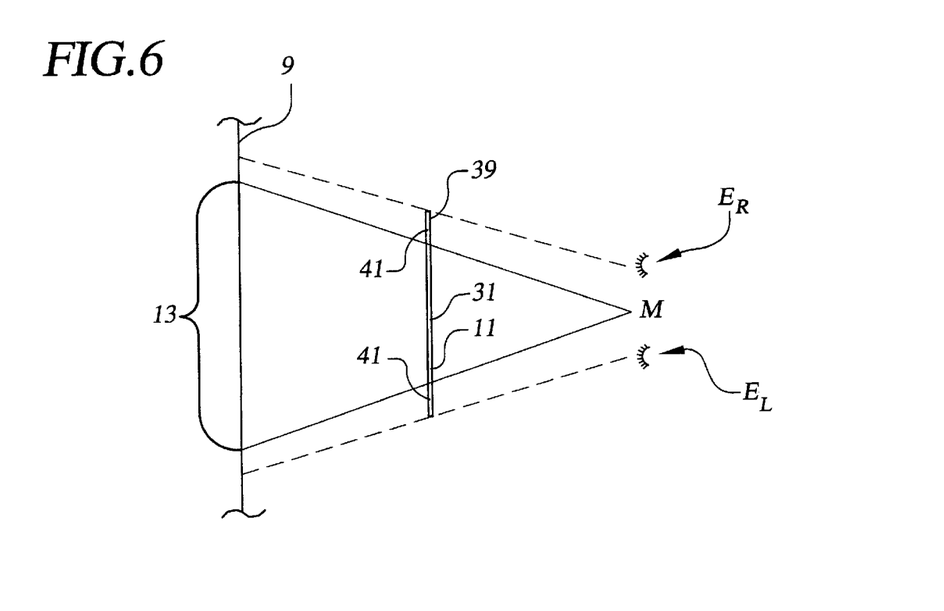
FIG. 6 is a plan-view diagram as in FIG. 5, showing the correction of the problem according to the invention.

The filtering structure 39 consequently improves the realism of a HUD simulator that has no virtual occulting of the HUD display. In addition, where virtual occulting is used, the filtering structure eliminates the binocular problem completely. As illustrated in FIG. 6, when the combiner 11 is provided with filtering structure 39 with lateral portions 41, it is not possible for either eye $E_R$ or $E_L$ to look directly at the HUD field 13. If either eye looks at the HUD field 13 through clear center portion 31, the HUD symbology is visible, as in a real system. If either eye looks at the HUD field 13 through a lateral portion 41, as discussed above, the HUD symbology cannot be seen. If either eye looks to the lateral side of the filter 39, the closest unrestricted lines of sight F and G reach the screen 9 spaced laterally from the HUD field 13, and no symbology can be seen.

This present invention has particular applicability to virtually occluded HUD simulators that simulate pupil-forming HUDS, such as those of F22 or F16 aircraft.

While a flat screen 9 has been shown it will be understood that a different geometry, e.g. spherical, toric, etc., may also be used advantageously with the invention.

The terms used herein should be read as terms of description rather than of limitation, as those of skill in the art with this specification before them will be able to make modifications therein without departing from the spirit of the invention. Other embodiments beyond those here discussed are within the spirit and scope of the appended claims.

What is claimed is:

1. A vehicle simulation system for simulating a vehicle for a human user, said system comprising:

an image system forming on a screen a visual image viewable by the user, said image including a scene representing a simulated view outside the vehicle and head-up display image superposed on said scene;

a combiner structure through which the user can see, said combiner structure being positioned so that said image with the head-up display image can be viewed therethrough by the user;

a filtering structure supported in the vehicle simulation system laterally outward of said combiner structure, viewed from a position of the user in operation of the vehicle simulation system;

said filtering structure permitting the user to see the scene therethrough, but limiting the passage of light from the head-up display image therethrough, so as to reduce the user seeing the image outside said combiner structure.

2. The system of claim 1, and further comprising a tracking apparatus detecting changing positions of the head of the user and providing a signal representative of a position of the head and of the user, and the head-up display image being limited based on the signal so that the projected head-up display image is only the head-up display image which can be seen through the combiner structure from a point on the head of the user.

3. The system of claim 2, wherein the head-up display image is limited based on the signal so that the projected head-up display image is only the head-up display image that can be seen through the combiner structure from a midpoint between eyes of the user.

4. The system of claim 1, wherein the filtering structure is a notch filter, and the head-up display image is of light of a wavelength substantially blocked by said filter.

5. The system of claim 1, wherein the filtering structure comprises a filter that polarizes light passing therethrough, and the light from the head-up display image is polarized so as to be blocked by the filter.

6. The system of claim 5, wherein the screen preserves polarization of light projected thereagainst.

7. The system of claim 1, wherein the filtering structure comprises a filter that permits passage of light only at separated time intervals between which the filter becomes substantially opaque, and the head-up display image being formed on the screen only when said filter is opaque.

8. The system according to claim 1, wherein the combiner structure is a dummy combiner structure.

9. A vehicle simulation system for simulating a vehicle for a human user, said system comprising:
    an image system forming on a screen a visual image viewable by the user, said image including a scene representing a simulated view outside the vehicle and head-up display image superposed on said scene;
    a combiner structure through which the user can see, said combiner structure being positioned so that said image with the head-up display image can be viewed therethrough by the user;
    a filtering structure on the said combiner structure, said filtering structure permitting the to see the scene therethrough, but limiting the passage of light from the head-up display image therethrough, to reduce the user seeing the head-up display image outside said combiner structure; and
    said combiner structure having two opposing lateral sides, said filtering structure extending laterally outward from each of said sides.

10. The system of claim 9, and said filtering structure extending laterally from the combiner structure a distance of at least about 1 inch.

11. The system of claim 9, wherein the filtering structure is a notch filter, and the head-up display image is of light of a wavelength substantially blocked by said filter.

12. The system of claim 9, wherein the filtering structure comprises a filter that polarizes light passing therethrough, and the light from the head-up display image is polarized so as to be blocked by the filter.

13. The system of claim 9, wherein the filtering structure comprises a filter that permits passage of light only at separated time intervals between which the filter becomes substantially opaque, and the head-up display image being formed on the screen only when said filter is opaque.

14. The system according to claim 9, wherein the combiner structure is a dummy combiner structure.

15. A vehicle simulation system for simulating a vehicle for a human user, said system comprising:
    a projection screen viewable by the user;
    an image system projecting a visual image on said screen, said image including a scene representing a simulated view outside the vehicle and a head-up display image superposed on said scene;
    a combiner structure positioned so that the screen can be viewed by the user through said combiner structure;
    a filtering structure supported on the vehicle simulation system laterally outward of said combiner structure;
    said filtering structure filtering out light of the head-up image viewed therethrough so as to reduce viewing of the head-up image by the user through said filtering structure as compared to viewing of the head-up image through the combiner structure; and
    said filtering structure permitting passage of light of the simulated view outside the vehicle therethrough so that the user can see said simulated view of the scene therethrough.

16. The system according to claim 15, wherein the combiner structure is a dummy combiner structure.

17. The system of claim 15, and further comprising a tracking apparatus detecting changing positions of the head of the user and providing a signal representative of a position of the head of the user, and the head-up display image being limited based on the signal so that the projected head-up display image is only the image which can be seen through the combiner structure from a point on the head of the user.

18. The system according to claim 17, wherein the combiner structure is a dummy combiner structure.

19. The system of claim 17, wherein the point on the head of the user is a midpoint between eyes of the user.

20. The system of claim 15, wherein the filtering structure is a first filter permitting passage therethrough of light of a plurality of wavelengths, but substantially blocking passage of light of a notch wavelength, and the head-up display head-up display image being formed of light of the notch wavelength.

21. The system of claim 15, wherein the simulated scene is projected through a notch filter which has similar transmission characteristics to said first filter.

22. The system of claim 15, wherein the filtering structure comprises a filter that polarizes light passing therethrough, and the light from the head-up display image is polarized so as to be blocked by the filter.

23. The system of claim 22, wherein the screen preserves polarization of light projected thereagainst.

24. The system of claim 15, wherein the filtering structure comprises a filter that permits passage of light only at separated time intervals between which the filter becomes substantially opaque, and the head-up display image being formed on the screen only when said filter is opaque.

25. The system of claim 15, wherein the image system combines a scene projector projecting the scene on the screen and a head-up display projector projecting the image on the screen.

26. The system of claim 15, wherein the filtering structure is at least about 1 inch wide.

27. A vehicle simulation system for simulating a vehicle for a human user, said system comprising:
    a projection screen viewable by the user;
    an image system projecting a visual image on said screen, said image including a scene representing a simulated view outside the vehicle and head-up display image superposed on said scene;
    a combiner structure positioned so that the screen can be viewed by the user through said combiner structure;
    a filtering structure on said combiner structure, said filtering structure filtering out the head-up image viewed therethrough; and
    wherein the filtering structure projects laterally outward from lateral sides of the combiner structure.

28. The system of claim 27, and the filtering structure projecting generally upwardly from an upper end of the combiner structure.

29. The system of claim 27, wherein the filtering structure is a notch filter, and the head-up display image is of light of a wavelength substantially blocked by said filter.

30. The system of claim 27, wherein the filtering structure comprises a filter that polarizes light passing therethrough, and the light from the head-up display image is polarized so as to be blocked by the filter.

31. The system of claim 27, wherein the filtering structure comprises a filter that permits passage of light only at separated time intervals between which the filter becomes substantially opaque, and the head-up display image being formed on the screen only when said filter is opaque.

32. The system according to claim 27, wherein the combiner structure is a dummy combiner structure.

* * * * *